Nov. 30, 1965 W. J. GESEK ETAL 3,221,154

COMPUTER CIRCUITS

Filed June 9, 1960 3 Sheets-Sheet 1

INVENTORS
William J. Gesek &
Laszlo L. Rakoczi

BY John V. Regan
Attorney

INVENTORS
William J. Gesek &
Laszlo L. Rakoczi
By John V. Regan
Attorney

Nov. 30, 1965 W. J. GESEK ETAL 3,221,154

COMPUTER CIRCUITS

Filed June 9, 1960 3 Sheets-Sheet 3

INVENTORS
William J. Gesek &
Laszlo L. Rakoczi

BY John V. Regan
Attorney

United States Patent Office 3,221,154

Patented Nov. 30, 1965

3,221,154

COMPUTER CIRCUITS

William J. Gesek, Linden, and Laszlo L. Rakoczi, Merchantville, N.J., assignors to Radio Corporation of America, a corporation of Delaware Filed June 9, 1960, Ser. No. 34,939
15 Claims. (Cl. 235—153)

This application relates to new and improved parity check and parity generator circuits.

A "word," in computer terminology, is an ordered set of characters and is in the normal unit in which information may be stored, transmitted or otherwise operated on in a computer. A "character" is a number, letter or other piece of intelligence and is represented in a digital computer in a pattern of binary "ones" and binary "zeros." "Parity check" is a method of checking errors in a word or character. The check makes use of a self-checking code in which the total number of "ones" (or "zeros") is always even or odd. A check may be made for either odd or even parity. In the former case, a so-called "parity bit" in a word is initially made either a "one" or a "zero" to insure that the total number of "ones" in the word is odd. If, in this case, the word is later checked and found to have an odd number of "ones," parity is correct and it is assumed that there are no errors.

Parity check circuits in commercially available computers are, so far as is known, operated in a synchronous manner. In other words, the bits of the word checked occur either concurrently or in a known periodic pattern. In one such computer, the circuit to which the bits are applied adds the number of "ones" in the word. Since the length of time required for the addition may depend upon the number of "ones" which must be added and may also depend upon other variable parameters, a certain minimum time must be allowed for the addition to be performed. This minimum time must be adequate to permit the longest addition time contemplated (the "worst case" condition).

A disadvantage of this known system is that it is relatively slow since the circuit can operate only as fast as permitted by the worst case condition. Another disadvantages of the circuit is that if, due to aging, or other varying circuit parameters, a bit is delayed sufficiently that the parity check is not completed in the time allocated for the worst case condition, the parity check circuit may cease to function. Another disadvantage is that the parity check circuit may mistake the absence of information for a binary digit. Thus, the circuit may indicate that parity is correct in the absence of part of the word the parity of which is being checked. A further disadvantage of this circuit is that it can sometimes operate in what is known as a "race condition." This refers to a condition in which the parity check circuit mistakes the absence of a binary digit for the presence of a binary digit and the binary digit later occurs. This later occurring binary digit may cause circuits which were previously settled in one condition to be switched to another condition and produce extraneous output signals.

An objective of the present invention is to provide an improved circuit which is capable of checking the parity of a word made up of asynchronously occurring binary bits. The term "asynchronous," as used here, refers to the occurrence of binary bits making up a word during time intervals not related to one another by any law. The differences in occurrence times may be due, for example, to different delays inserted by different stages in the computer through which the different bits of information pass.

Another objective of the invention is to provide a circuit which can check or generate the parity of a word at high operating speeds.

Another objective of the invention is to provide a parity circuit which can distinguish the absence of a binary digit from the presence of a binary digit.

Another objective of the invention is to provide a parity circuit which includes means for preventing operation in a "race condition" as described above.

Another objective of the invention is to provide a parity circuit which continues to operate correctly even though the stages making up the circuit change the delays they introduce with time or other changing circuit parameters.

Another objective of the invention is to provide a parity circuit which can employ relatively cheap circuit elements such as cheap transistors, which vary relatively widely element-to-element in parameters such as time delay.

The system of the invention includes a circuit responsive to the presence of all binary digits in a word for producing an indication of an odd or even number of "ones" in the word, and means in the circuit responsive to the absence of one or more of the binary digits in the word for preventing the production of the indication. The indication may be a binary indication and, in a specific form of the invention, is a binary digit and its complement.

One way in which the indication above may be obtained is to examine the binary digits in a word and complements of these digits a group at a time to thereby derive a fewer number of digits and their complements, each indicative of an odd or even number of words in a group of digits examined. The fewer number of digits are subsequently examined in the same manner to obtain still fewer number of digits and their complements. The process is continued until a single digit and its complement is derived which indicates an odd or even number of "ones" in the word. The digits of the word arrive in asynchronous fashion. The circuit includes means for preventing the generation of the single digit and its complement in the absence of a bit of information and its complement. The single digit and its complement may be used as a parity check digit in known fashion, or may be compared with a parity bit and its complement to check parity or may be employed to generate a parity bit.

The invention is described in greater detail in the following description and in the drawings in which.

The individual blocks shown in the figures above are in themselves known circuits. The circuits of the blocks are actuated by electrical signals applied to the blocks.

When the signal is at one level, it represents the binary digit "one" and when it is at another level, it represents the binary digit "zero." For the sake of the discussion which follows, it may be assumed that a high level signal represents the binary digit "one" and a low level signal the binary digit "zero." Also, to simplify the discussion, rather than speaking of an electrical signal being applied to a block or a logic stage, it is hereafter stated that a "one" or "zero" is applied to the block or stage.

Throughout the figures a logic circuit known as a multiple input "none" gate is used. A "none" gate produces a "one" output when all of the inputs to the gate are "zero" and a "zero" output when one or more of the inputs are "one." This gate may consist of an inverter connected to each of the input leads to the gate and an "and" gate to which the inverted inputs are applied. Alternatively, a "none" gate may consist of an "or" gate which receives each of the inputs followed by an inverter. The Boolean equation for a "none" gate having A and B inputs and a C output is $\overline{A}\cdot\overline{B}=C$ (1) or $\overline{A+B}=C$ (1*a*) and the truth table for the gate is

| A | B | C |
|---|---|---|
| 0 | 0 | 1 |
| 0 | 1 | 0 |
| 1 | 0 | 0 |
| 1 | 1 | 0 |

Figure 1:
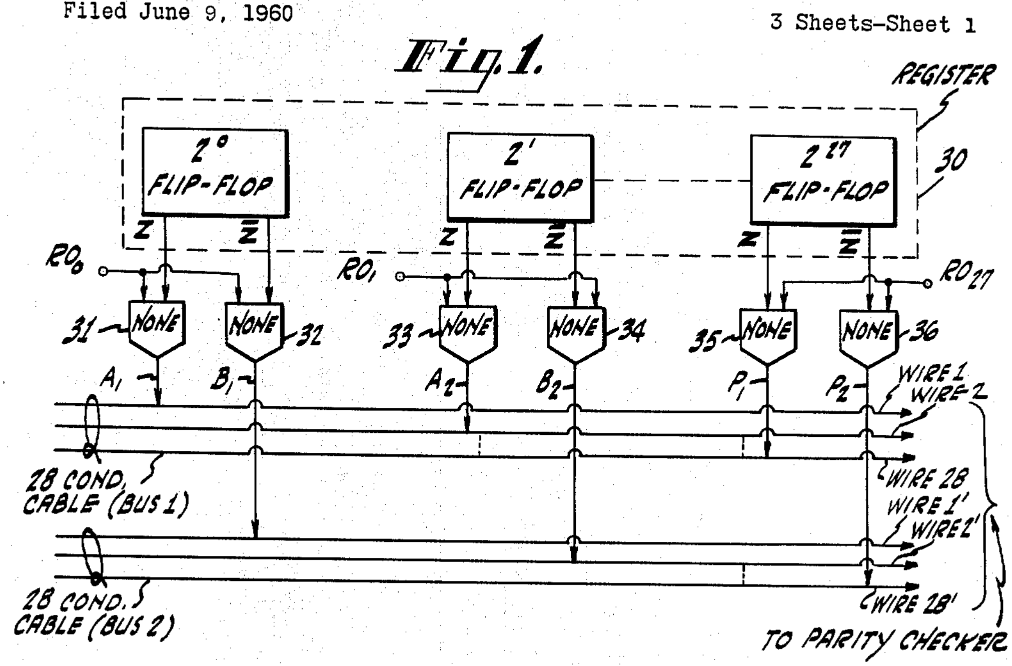
FIG. 1 is a block circuit diagram of a portion of a digital computer showing buses which carry information bits.

A small part of a digital computer with which the parity circuit of the present invention may be used is shown in FIG. 1. The computer has two 28 conductor cables hereafter termed "bus 1" and "bus 2." Twenty-seven wires of bus 1 are for transmitting information bits $A_1$–$A_{27}$ (the 27 information bits which form a word in this computer), respectively, and the 28th wire of bus 1 is for transmitting a parity bit $P_1$. In like manner, 27 wires of bus 2 are for transmitting information bits $B_1$–$B_{27}$, the 28th wire is for transmitting the parity bit $P_2$.

A large number of registers may be connected to the wires of the two buses. Each of the registers includes 28 flip-flops, one for each wire of each bus. To simplify the system for the purposes of the present discussion, only one of these registers, illustrated by dashed block 30, is shown. Also, to simplify the discussion, only three of the 28 flip-flops in the register are shown. These are legended the $2^0$ flip-flop, the $2^1$ flip-flop, and $2^{27}$ flip-flop. Each flip-flop has a first output Z and a second output $\overline{Z}$. In other words, when output Z represents the binary digit "one," output $\overline{Z}$ represents the binary digit "zero" and vice versa.

The Z output of the $2^0$ flip-flop is connected through "none" gate 31 to wire 1 of bus 1. The $\overline{Z}$ output of the $2^0$ flip-flop is connected through "none" gate 32 to wire 1 of bus 2. In like manner, the Z and $\overline{Z}$ outputs of the $2^1$ flip-flop are connected through "none" gates 33 and 34 to wire 2 of buses 1 and 2, respectively, the Z and $\overline{Z}$ outputs of the $2^2$ flip-flop (not shown) are connected through "none" gates (not shown) to wire 3 (not shown) of buses 1 and 2, respectively, and so on, and the Z and $\overline{Z}$ outputs of flip-flop $2^{27}$ are connected through "none" gates 35 and 36 to wire 28 of buses 1 and 2, respectively.

"None" gates 31–36 are multiple input "none" gates. The first input has already been described. The second input is a binary digit RO (Read-out command) which arrives from the programmer or some other place in the computer. The binary digit RO is normally a "one" so that "none" gates 31–36 are normally inactivated. When it is desired that a "none" gate be placed in condition to conduct, RO is changed from "one" to "zero." It may be assumed for the purposes of the present discussion that the RO digits occur asynchronously, that is, they may arrive at the "none" gates 31–36 during different time intervals. This may be due to different delays imparted by the stages through which the RO voltages pass and the different delays in turn may be due to different times required by the different stages to perform their logic functions or to different inherent delays in the elements making up the logic stages.

The circuit of FIG. 1 operates as follows. Each RO is normally "one" so that "none" gates 31–36 are normally cut off. This means that the outputs of the "none" gates, that is, $A_1$–$A_{27}$ and $P_1$ and $B_1$–$B_{27}$ and $P_2$ are "zero." When it is desired to transfer the information from the register to the wires of the two buses, $RO_0$–$RO_{27}$ are changed from "one" to "zero." If the Z output of the $2^0$ flip-flop is "zero" and the $\overline{Z}$ output "one," then "none" gate 31 conducts and "none" gate 32 remains cut off. This means that $A_1=1$ and $B_1=0$. Similarly, one of "none" gates 33 or 34 will conduct so that $A_2$ will be one binary digit and $B_2$ its complement and so on. In other words, in the general case, when $A=\overline{B}$ or $B=\overline{A}$, then information is present; when $A=B=0$, then information is absent; the situation in which both A and B are "one" is not possible.

Figure 2:
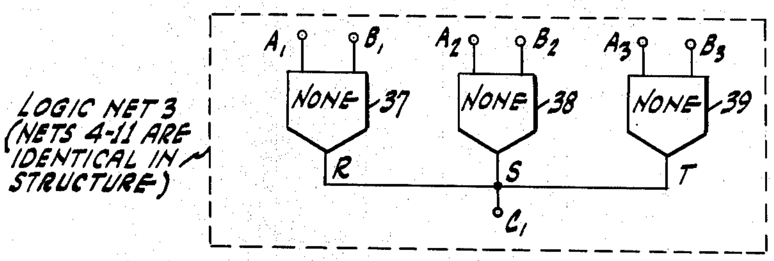
FIGS. 2–6 are block circuit diagrams of various portions of the parity circuit of the present invention.

The first stage or logic net in the parity checker is shown in FIG. 2. It is legended "Logic Net 3." There are nine such logic nets which are identical in structure, however, each has different inputs and different outputs. Each net consists of three "none" gates 37, 38 and 39. The purpose of each logic net is to determine whether information is present on three leads of a bus. In the example chosen for illustration, the logic net determines whether the $A_1$, $A_2$ and $A_3$ bits are present.

The Boolean expression describing the output $C_1$ of the network is $$C_1=R+S+T \tag{2}$$

Substituting equations like (1) into (2) gives $$C_1=\overline{A}_1\cdot\overline{B}_1+\overline{A}_2\cdot\overline{B}_2+\overline{A}_3\cdot\overline{B}_3 \tag{3}$$

or in the general case $$C_n=\overline{A}_{3n-2}\cdot\overline{B}_{3n-2}+\overline{A}_{3n-1}\cdot\overline{B}_{3n-1}+\overline{A}_{3n}\cdot\overline{B}_{3n} \tag{4}$$

where $n$ is a digit from one to nine. $n=N-2$ where N refers to the logic net from which the C term is derived.

From the equations above it can readily be seen that if $A_1$ and $B_1$, for example, are both "zero" or if $A_2$ and $B_2$ are both "zero" or if $A_3$ and $B_3$ are both "zero," then the "none" gate connected to receive that pair of inputs will conduct. This means that $C_1$ will be "one." In other words, $C_1$ is "one" if information is not present on the wires carrying $A_1$ or $A_2$ or $A_3$. On the other hand, if one of $A_1$ and $B_1$ is "one" and one of $A_2$ and $B_2$ is "one" and one of $A_3$ and $B_3$ is "one," then $C_1$ changes to "zero." $C_1=0$, therefore, is an indication that information is present on the first three wires of bus 1 and, by the same token, information in complemented form is present on the wires of bus 2. In like manner, $C_2$ through $C_9$ each change from "one" to "zero" when the three bits of the word applied to the logic net from which that C is derived, each represent the presence of information.

Figure 3:
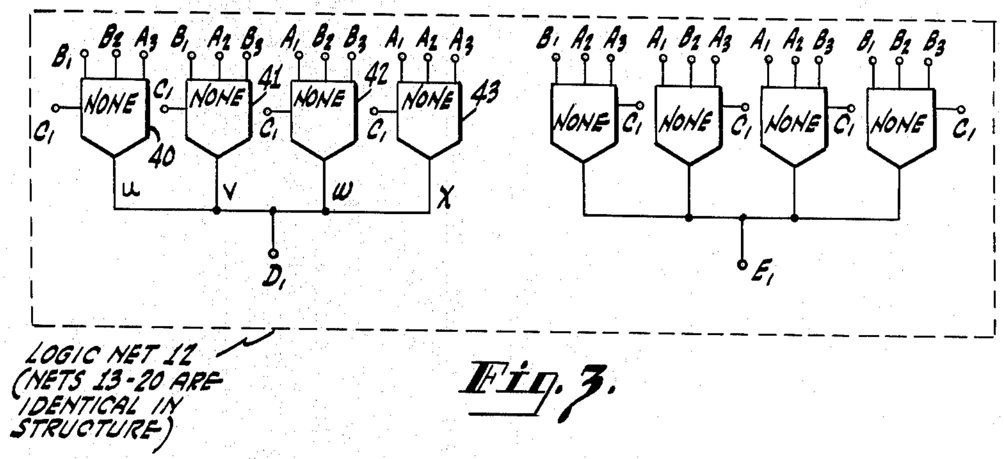

A second logic net in the parity circuit is shown in FIG. 3 and legended logic net 12. Logic nets 13–20 are identical in structure to net 12 but have different binary input bits applied and different outputs. For example, logic net 13 has the binary digits $A_4$, $A_5$ and $A_6$ and $B_4$, $B_5$ and $B_6$ applied and an ouput $D_2$ and $E_2$. Logic net 14 has the bits $A_7$, $A_8$ and $A_9$ and $B_7$, $B_8$ and $B_9$ applied and so on. This is shown more clearly in FIG. 7 which will be discussed in more detail later.

The purpose of logic net 12 is to examine the first three bits $A_1$–$A_3$ (or $B_1$–$B_3$), respectively, and to produce an output which indicates whether there are an odd or an even number of "ones." When there are an odd number of "ones," then, as will be shown below, E becomes "one" and D remains "zero" and when there are an even number of "ones," then E remains "zero" and L becomes "one."

Logic net 12 includes eight "none" gates 40–47. The first four gates have their outputs connected together and the second four their outputs connected together. Each gate has a $C_1$ input and various combinations of A and B inputs taken three at a time. It may be seen by inspection that if $A_1$ or $A_2$ or $A_3$ information is not present, $C_1$ remains "one" and all of the "none" gates 40–47 remain cut off. This means that $D_1$ and $E_1$ remain "zero." If the $A_1$ and $A_2$ and $A_3$ information is present, then $C_1$ changes to "zero" and gates 41–47 are in condition to conduct. It follows that the information $A_1$–$A_3$ may arrive at logic nets 3–11 in asynchronous fashion and this will in no sense affect the operation of logic nets 12–20. The latter wait until the information has arrived at logic nets 3–11 and then are enabled. Since the A and B information occurs asynchronously and also since the "none" gates of logic nets 3–11 may have different delays, the various C voltages will occur asynchronously. Accordingly, the logic nets 12–20 also operate in asynchronous fashion. The operation of logic nets 12–20 is described by the following Boolean equations, using logic net 12 as an example and then deriving the general expression $$D_1=U+V+W+X \quad (5)$$

Substituting A's and B's for U–X and factoring out $\overline{C}_1$ gives $$D_1=\overline{C}_1(\overline{B}_1\cdot\overline{B}_2\cdot\overline{A}_3+\overline{B}_1\cdot\overline{A}_2\cdot\overline{B}_3+\overline{A}_1\cdot\overline{B}_2\cdot\overline{B}_3+\overline{A}_1\cdot\overline{A}_2\cdot\overline{A}_3) \quad (6)$$

In like manner $$E_1=\overline{C}_1(\overline{B}_1\cdot\overline{A}_2\cdot\overline{A}_3+\overline{A}_1\cdot\overline{B}_2\cdot\overline{A}_3+\overline{A}_1\cdot\overline{A}_2\cdot\overline{B}_3+\overline{B}_1\cdot\overline{B}_2\cdot\overline{B}_3) \quad (7)$$

It may easily be shown that in the general case $$D_n=\overline{C}_n(\overline{B}_{(3n-2)}\cdot\overline{B}_{(3n-1)}\cdot\overline{A}_{3n}+\overline{B}_{(3n-2)}\cdot\overline{A}_{(3n-1)}\cdot\overline{B}_{3n}+\overline{A}_{(3n-2)}\cdot\overline{B}_{(3n-1)}\cdot\overline{B}_{3n}+\overline{A}_{(3n-2)}\cdot\overline{A}_{(3n-1)}\cdot\overline{A}_{3n}) \quad (8)$$

$$E_n=\overline{C}_n(\overline{B}_{(3n-2)}\cdot\overline{A}_{(3n-1)}\cdot\overline{A}_{3n}+\overline{A}_{(3n-2)}\cdot\overline{B}_{(3n-2)}\cdot\overline{A}_n+\overline{A}_{(3n-2)}\cdot\overline{A}_{(3n-1)}\cdot\overline{B}_{3n}+\overline{B}_{(3n-2)}\cdot\overline{B}_{(3n-1)}\cdot\overline{B}_{3n}) \quad (9)$$

where $n$ is an integer from one to nine. $n=N-11$ where N refers to the logic net from which the D and E terms are derived.

Simply stated, the above equations say that when the three bits of A information and three bits of B information to be examined are present, $E=1$ and $D=0$ when there are an odd number of "ones" and in the three A input bits, and $E=0$ and $D=1$ when there are an even number of "ones" in the three A input bits. The truth table for a logic net 12, as an example (assuming that $C_1=0$), is as follows.

| $A_1$ | $A_2$ | $A_3$ | $B_1$ | $B_2$ | $B_3$ | $D_1$ | $E_1$ | Number of A's | Conducting gate |
|---|---|---|---|---|---|---|---|---|---|
| 0 | 0 | 0 | 1 | 1 | 1 | 1 | 0 | Even | 43 |
| 0 | 0 | 1 | 1 | 1 | 0 | 0 | 1 | Odd | 46 |
| 0 | 1 | 0 | 1 | 0 | 1 | 0 | 1 | do | 45 |
| 0 | 1 | 1 | 1 | 0 | 0 | 1 | 0 | Even | 42 |
| 1 | 0 | 0 | 0 | 1 | 1 | 0 | 1 | Odd | 44 |
| 1 | 0 | 1 | 0 | 1 | 0 | 1 | 0 | Even | 41 |
| 1 | 1 | 0 | 0 | 0 | 1 | 1 | 0 | do | 40 |
| 1 | 1 | 1 | 0 | 0 | 0 | 0 | 1 | Odd | 47 |

Figure 4:
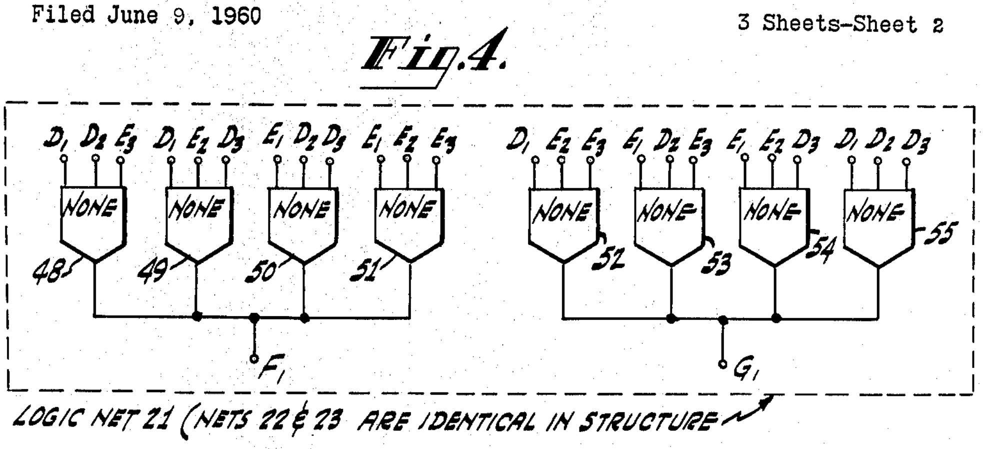

FIG. 4 shows one of the logic nets in the third stage of the parity circuit. It is legended "Logic Net 21" and includes eight "none" gates 48–55. Logic nets 22 and 23 are identical in structure with logic net 21 but have different inputs and outputs. For example, the inputs to logic net 22 are $D_4$, $D_5$, $D_6$ and $E_4$, $E_5$, $E_6$ and outputs $F_2$ and $G_2$ and the inputs to logic net 23 are $D_7$, $D_8$, $D_9$ and $E_7$, $E_8$, $E_9$. The purpose of these logic nets is to examine the D and E bits three at a time and to determine whether there are an odd or even number of "ones" in these bits. When of the three D inputs to a logic net the number of "ones" is odd, then $F=1$ and $G=0$; when of the three D inputs to the net the number of "ones" is even, then $F=0$ and $G=1$. It can also be shown that one of the three input bits is absent as, for example, when $D_1$ and $E_1$ both equal "zero," then the combinations of the remaining two bits such as $D_2$, $D_3$ and $E_2$, $E_3$ are such that $F_1$ and $G_1$ both equal "one."

The operation of the circuit of FIG. 4 is quite similar to that of the one of FIG. 3. The Boolean expressions defining this operation for net 21 are $$\overline{F}_1=\overline{D}_1\cdot\overline{D}_2\cdot\overline{E}_3+\overline{D}_1\cdot\overline{E}_2\cdot\overline{D}_3+\overline{E}_1\cdot\overline{D}_2\cdot\overline{D}_3+\overline{E}_1\cdot\overline{E}_2\cdot\overline{E}_3 \quad (10)$$

$$G_1=\overline{D}_1\cdot\overline{E}_2\cdot\overline{E}_3+\overline{E}_1\cdot\overline{D}_2\cdot\overline{E}_3+\overline{E}_1\cdot\overline{E}_2\cdot\overline{D}_3+\overline{D}_1\cdot\overline{D}_2\cdot\overline{D}_3 \quad (11)$$

The general expression is not given but can easily be worked out as is shown in Equations 8 and 9 above.

The truth table for logic net 21 as an example of nets 21–23 is as follows.

| $D_1$ | $D_2$ | $D_3$ | $E_1$ | $E_2$ | $E_3$ | $F_1$ | $G_1$ | No. of ones in D digits | "None" gate conducting |
|---|---|---|---|---|---|---|---|---|---|
| 0 | 0 | 0 | 1 | 1 | 1 | 0 | 1 | Even | 55 |
| 0 | 0 | 1 | 1 | 1 | 0 | 1 | 0 | Odd | 48 |
| 0 | 1 | 0 | 1 | 0 | 1 | 1 | 0 | do | 49 |
| 0 | 1 | 1 | 1 | 0 | 0 | 0 | 1 | Even | 52 |
| 1 | 0 | 0 | 0 | 1 | 1 | 1 | 0 | Odd | 50 |
| 1 | 0 | 1 | 0 | 1 | 0 | 0 | 1 | Even | 53 |
| 1 | 1 | 0 | 0 | 0 | 1 | 0 | 1 | do | 54 |
| 1 | 1 | 1 | 0 | 0 | 0 | 1 | 0 | Odd | 51 |

Figure 5:
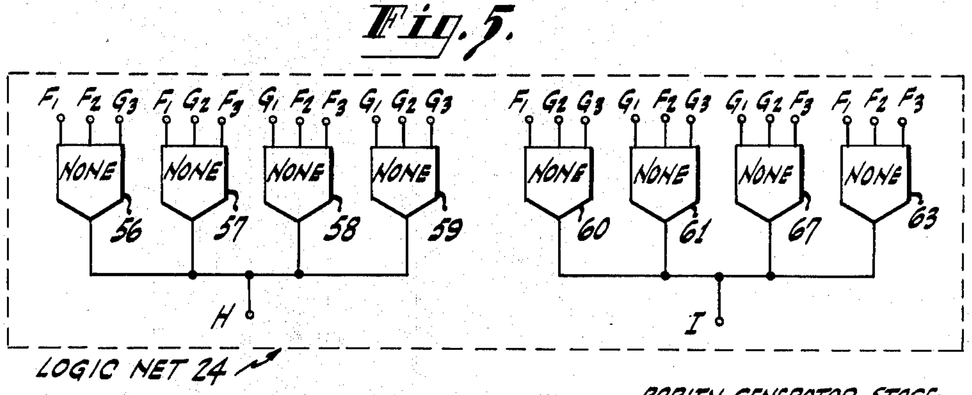

After the operations performed by logic nets 21–23 are completed, there remain two groups of three binary digits $F_1$, $F_2$, $F_3$ and $G_1$, $G_2$, $G_3$. The purpose of the circuit of FIG. 5 is to examine these three digits and to indicate whether there are an odd or an even number of digits in each group. The circuit of FIG. 5 is identical to the one of FIG. 4. It includes eight "none" gates 56–63, respectively, connected in groups of four. Each "none" gate receives different combinations of F and G inputs. The first four "none" gates produce an H output and the second four an I output.

The Boolean expressions describing the operation of logic net 25 are:

$$H=\overline{F}_1\cdot\overline{F}_2\cdot\overline{G}_3+\overline{F}_1\cdot\overline{G}_2\cdot\overline{F}_3+\overline{G}_1\cdot\overline{F}_2\cdot\overline{F}_3+\overline{G}_1\cdot\overline{G}_2\cdot\overline{G}_3 \quad (12)$$

$$I=\overline{F}_1\cdot\overline{G}_2\cdot\overline{G}_3+\overline{G}_1\cdot\overline{F}_2\cdot\overline{G}_3+\overline{G}_1\cdot\overline{G}_2\cdot\overline{F}_3+\overline{F}_1\cdot\overline{F}_2\cdot\overline{F}_3 \quad (13)$$

The truth table for logic net 24 is:

| $F_1$ | $F_2$ | $F_3$ | $G_1$ | $G_2$ | $G_3$ | H | I | No. of ones in $F_1$ digits | "None" gate conducting |
|---|---|---|---|---|---|---|---|---|---|
| 0 | 0 | 0 | 1 | 1 | 1 | 0 | 1 | Even | 63 |
| 0 | 0 | 1 | 1 | 1 | 0 | 1 | 1 | Odd | 56 |
| 0 | 1 | 0 | 1 | 0 | 1 | 1 | 0 | do | 57 |
| 0 | 1 | 1 | 1 | 0 | 0 | 0 | 1 | Even | 60 |
| 1 | 0 | 0 | 0 | 1 | 1 | 1 | 0 | Odd | 58 |
| 1 | 0 | 1 | 0 | 1 | 0 | 0 | 1 | Even | 61 |
| 1 | 1 | 0 | 0 | 0 | 1 | 0 | 1 | do | 62 |
| 1 | 1 | 1 | 0 | 0 | 0 | 1 | 0 | Odd | 59 |

From the equations and truth table above it is clear that when there are an even number of "ones" in the three F inputs, then $I=1$ and $H=0$ and when there are an odd number of "ones" in the three F inputs, then $I=0$ and $H=1$. Thus, the 27 bits originally examined have been reduced to a single bit. It can be shown that when these 27 bits are examined three at a time and the resulting nine examined three at a time and the resulting three examined three at a time, as has been done, the final binary bit I which results is "one" when the 27 A bits have an odd number of "ones" and the final output bit I is "zero" when the 27 A input bits have an even number of "ones."

Figure 6:
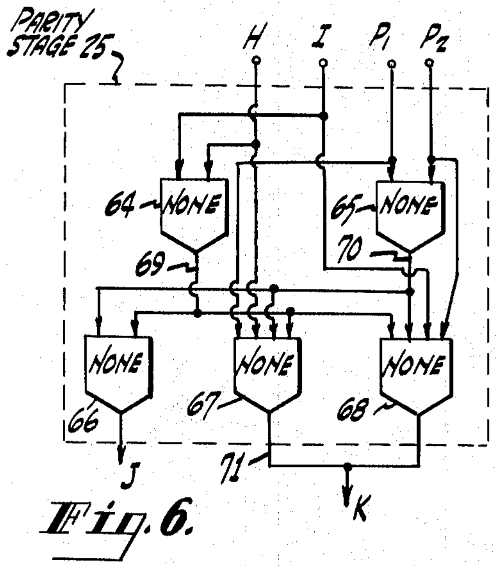

The final stage of the parity system is shown in FIG. 6. It receives the two parity bits $P_1$ and $P_2$ from the two buses 1 and 2 (FIG. 1) and the H and I bits from logic net 24. The stage includes five "none" gates 64–68, respectively.

The circuit operation may be better understood by making certain assumptions. The first is that it is desired to check odd parity. This means that when there are an even number of "ones" in the 27 information bits $A_1$–$A_{27}$, the corresponding parity bit $P_1$ is "one" and when there are an odd number of "ones" in these 27 A bits, the corresponding parity bit $P_1$ is "zero." It will also be assumed that the parity is correct, that is, the 27 A bits have an odd number of "ones," so that $I=1$, $H=0$, $P_1=0$ and $P_2=1$. H and I are applied as inputs to "none" gate 64. Since $H=0$ and $I=1$ "none" gate 64 is cut off and a "zero" appears at output lead 69. In like manner, since $P_1$ is "zero" and $P_2$ is "one," "none" gate 65 is cut off and a "zero" appears at output lead 70. "None" gate 66 receives its information from "none" gates 65 and 64, and since both gates are producing "zero" outputs, "none" gate 66 conducts and $J=1$. The $J=1$ output is an indication that all of the 27 A information bits have been received. "None" gate 67 receives "zeros" from the "none" gates 65 and 64, a "zero" from $H=0$ and a "zero" from $P=0$. Since all of the inputs are "zero" this "none" gate conducts and a $K=1$ output appears at lead 71. $K=1$ means that parity is correct.

Assume now that $I=0$, $H=1$, $P_1=1$ and $P_2=0$. This again is an indication that parity is correct. $I=0$ means that the number of "ones" in the A bits are even, and $P_1=1$ to make the parity odd. Again, gates 64 and 65 conduct. Therefore, "none" gate 66 conducts and $J=1$ indicating that all information is present. "None" gate 68 receives a $P_2=0$ input and $I=0$ input and the other "zero" inputs from "none" gates 64 and 65. Accordingly, "none" gate 68 conducts and $K=1$ indicating correct parity.

Assume now that $I=1$, $H=0$, $P_1=1$ and $P_2=0$. $I=1$ indicates an odd number of "ones" in the 27 A input bits and since $P_1=1$, in addition, this gives an even number of "ones" in the total or an incorrect parity indication. "None" gates 64 and 65 both receive "one" inputs so that they are both cut off. Accordingly, "none" gate 66 receives two "zero" inputs and produces a $J=1$ output.

This indicates that all information has been received. "None" gate 67 receives a $P_1=1$ input and is accordingly cut off and "none" gate 68 receives a $I=1$ input and is accordingly cut off. Therefore, the output of the two gates 67 and 68 is $K=0$, an indication that parity is incorrect.

In the last example, it is assumed that parity is correct $I=0$, $P_1=1$ and $P_2=0$ but that one piece of information has not been received so that $H=0$. In this case, the H and I inputs to "none" gate 64 are both "zero" and a "one" appears at output lead 69. This "one" cuts off "none" gate 66, and a $J=0$ appears at its output. This is an indication that not all of the input information has arrived at the parity stage 25. The "one" output of "none" gate 64 is also applied to "none" gates 67 and 68 so that $K=0$, an indication that parity is not correct.

Figure 7:
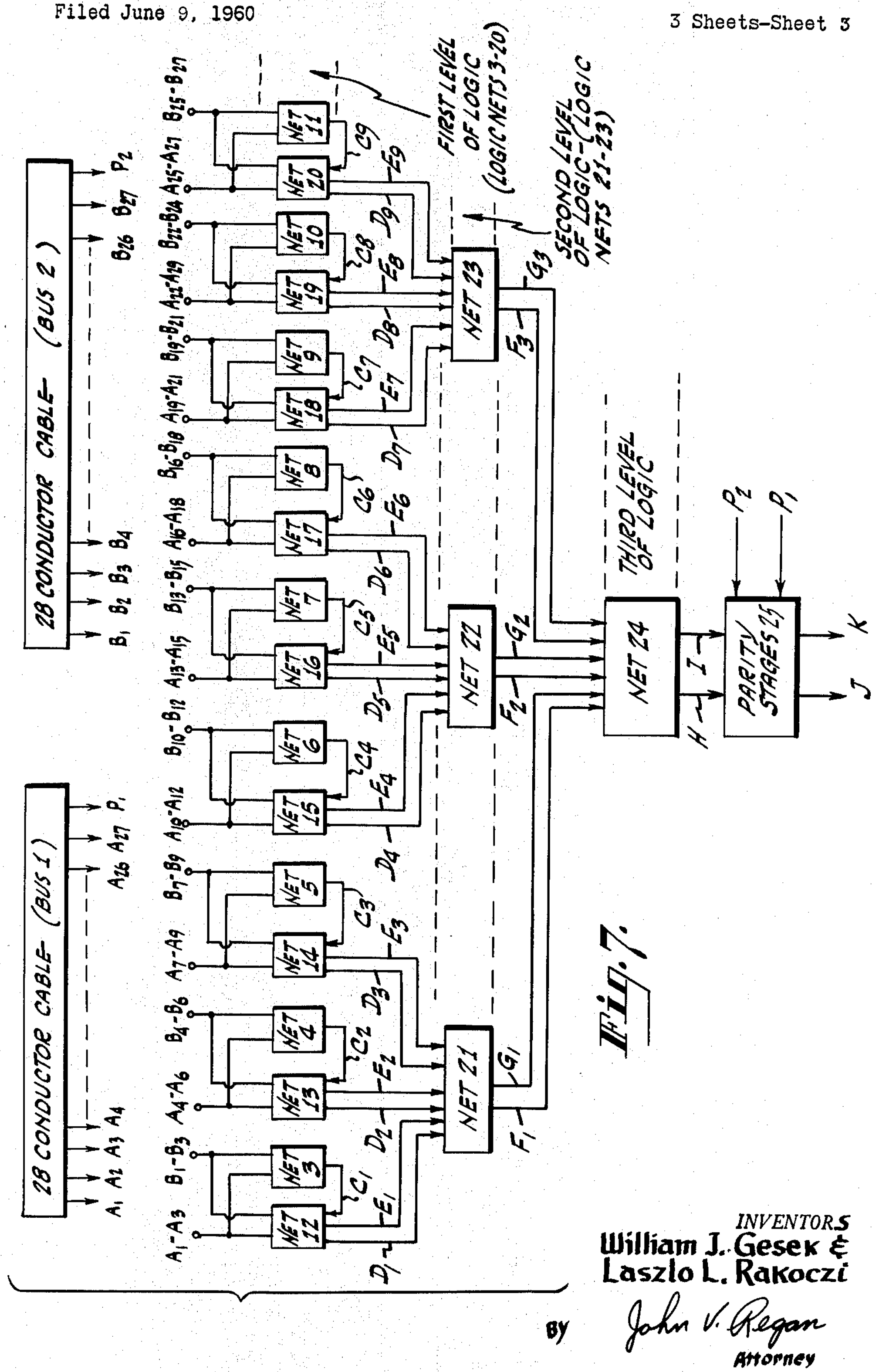
FIG. 7 is a block circuit diagram of the complete parity check circuit of the invention.

The complete parity check system is shown in FIG. 7. The various blocks making up the system have already been described in detail and are similarly numbered. The various leads in FIG. 7 sometimes represent a single wire and sometimes several wires. For example, the first lead at the upper left labeled "$A_1$–$A_3$" represents three conductors and the second lead from the left labeled "$B_1$–$B_3$" represents three conductors.

When no information is present, all of the A's, all of the B's and $P_1$ and $P_2$ equal "zero." All of the C's (the outputs of logic nets 3–11) equal "one." All of the D's and E's equal "zero." All of the F's and G's equal "one." H and I equal "zero," and J and K equal "zero."

The function of logic nets 3–11 in the first level of logic is to examine the incoming bits three at a time to determine whether or not information is present. If information is present in the three bits examined, and accordingly also in the complements of these bits, for example, in $A_1$–$A_3$ and $B_1$–$B_3$, then C becomes "zero." When C becomes "zero," the logical net in the group 12–20 to which that C is applied is placed in condition to operate.

The function of logic nets 12–20 in the first level of logic is to examine the input digits and their complements three at a time and to produce an output indicating whether there are an odd or an even number of "ones" in the three digits examined. When the three A digits examined have an odd number of "ones," E becomes "one" and D remains "zero."

The purpose of nets 21–23 in the second level of logic is to examine the D digits (and their complements the E digits) three at a time to determine whether there are an odd or an even number of "ones" in the three E digits. When there are an odd number of "ones" in the three E digits examined, G remains "one," F becomes "zero."

The purpose of logic net 24 in the third level of logic is to examine the three F digits (and their complements the three G digits) to determine when there are an odd or an even number of "ones" in the three G digits. When there are an odd number of "ones" in the three G digits, I becomes "one" and H remains "zero."

The purpose of the parity stage 25 is to compare the parity bits $P_1$ and $P_2$ with the bits H and I to determine first, whether all information has reached parity stage and second, whether parity is correct.

The parity check circuit of FIG. 7 operates in an asynchronous fashion. In other words, the first A and complementary B digits may reach the nets in the first level of logic at different times. Each net waits until three digits and their complements arrive and then passes an output to a net in the second level of logic. In the same manner, the nets in the second level of logic wait until all information signals reach these nets before they pass information to the third level of logic.

An important advantage of the system is that it is capable of high speed operation even though incoming information arrives at different times and the various logic nets may have different inherent delays. This can be shown by the following example. Assume that the quickest piece of information reaches a logic net in the first level of logic in 0.2 microseconds and the slowest piece of information reaches the logic net in the first level of logic in two microseconds. Assume also that the fastest one of the nets imparts a delay of only 0.2 of a microsecond and the slowest a delay of two microseconds. If the circuit were a synchronous circuit, it would be necessary to design everything for the worst case condition, that is, a slow piece of information—one that requires two microseconds to reach a net and a slow net—one that imparts a two microsecond delay. In other words, at least four microseconds would have to be allowed between the time a piece of information started toward the first level of logic and could be passed on to the second level of logic. Moreover, some tolerance would have to be allowed to permit variations in the various delays so that six or eight microseconds would be the minimum time which would have to be allotted.

In the circuit of the present invention, the average speed of operation under the conditions assumed above would be closer to two microseconds than to six or eight microseconds on a statistical basis. In the worse possible case, a slow signal arrives at a slow stage giving the maximum delay of four microseconds. No tolerance is needed since each stage operates independently and no stage passes information on to the next stage until it completes its logic operation. In the average case, an average signal such as one delayed a microsecond or less reaches a stage operating at an average speed such as one microsecond or so giving a total delay of two microseconds. In another usual case, on a statistical basis, a fast signal, such as one delayed only 0.2 of a microsecond, reaches a slow stage, such as one operating in two microseconds, giving a total delay of slightly more than two microseconds. In another case, a slow signal, such as one delayed two microseconds, reaches a fast stage, such as one operating at 0.2 of a microsecond, again giving a total delay of slightly more than two microseconds.

Another important advantage of the circuit is that aging of components or other changing circuit parameters which may change the delay produced by individual ones of the logic nets do not make the circuit inoperative. They merely slow the stage down somewhat. For example, suppose that logic net 5 changes the delay it introduces from one to three microseconds. The circuit continues to operate perfectly, however, in the worst case the delay introduced by this stage would be three microseconds, its delay, plus two microseconds, the time required for the slowest signal to reach this stage.

Another advantage of this circuit is that lack of information is not mistaken for information. For example, suppose that binary bit $A_7$ does not arrive at logic net 14. This means that $A_7$ and $B_7$ are both "zero". $C_3$ remains "one". $D_3$ and $E_3$ therefore both remain "zero". $F_1$ and $G_1$ therefore both remain "one", H and I both remain "zero", and J and K both remain "zero". $J=0$ means that a piece of information has not reached the parity stage 25.

In prior art parity check circuits race conditions are possible. In such circuits, the final output may sometimes indicate correct parity when in fact an information bit is missing. In these circuits if the information bit arrives at a later time, the signal indicating incorrect parity suddenly switches to one indicating correct parity causing the generation of extraneous oscillations in the parity circuit. It is clear from FIG. 7 that this cannot occur in the present circuit. So long as there is information absent, J remains "zero".

Figure 8:
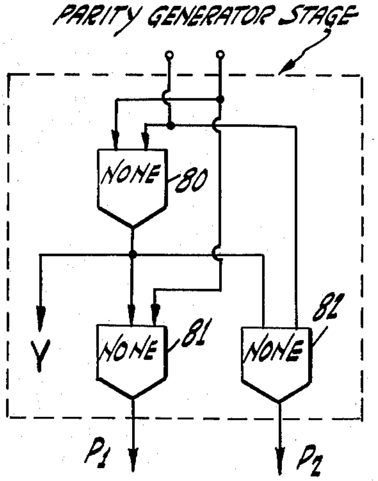
FIG. 8 is a block diagram of a circuit for generating a parity bit. This circuit replaces the parity stage 25 in the circuit of FIG. 7 when the circuit of FIG. 7 is used as a parity bit generator rather than a parity check circuit.

The circuit of the present invention is also useful as a parity generator. So operated, all of the stages of FIG. 7 through the third level of logic are employed. The H and I outputs indicate whether there are an odd or an even number of digits in the 27 bit word examined. As already noted, when the 27 A input bits have an odd number of "ones", $I=1$ and $H=0$ and when the 27 A input bits have an even number of "ones", $I=0$ and $H=1$. The H and I inputs are applied to the parity generator stage shown in FIG. 8. This stage includes three "none" gates 80–82 inclusive. The circuit operates as follows. Assume first that there are an odd number of "ones" in the A input bits so that $I=1$ and $H=0$. $I=1$ is applied to "none" gate 80 so that the output of this gate becomes a "zero". $H=0$ and the "zero" output of "none" gate 80 are applied to "none" gate 82 so that $P_2$ becomes "one", $I=1$ and the "zero" output of "none" gate 80 are applied to "none" gate 81 so that $P_1$ remains "zero". This is the correct answer, because when there are an odd number of "ones" in the A input bits, $P_1$, the parity bit corresponding to the A bits, should be "zero". Likewise, an odd number of "ones" in the A input bits corresponds to an even number of "ones" in the B input bits so that $P_2$, the parity bit for the B digits, should be "one".

Assume now that there are an even number of A input bits so that $I=0$ and $H=1$. Analysis of the circuit shows that $P_1$ becomes "one" and $P_2$ remains "zero" which is the correct answer.

Assume now that one piece of information has not arrived. For example, suppose that bit $A_{27}$ has not yet arrived so that $A_{27}$ and $B_{27}$ equal "zero". It has been already shown that when any bit is absent, H and I are both "zero". Under these circumstances, the output of "none" gate 80 becomes a "one" and $P_1$ and $P_2$ are both "zero". A signal indicating the absence of a piece of information may be taken at Y. When $Y=1$, there is information absent and when $Y=0$, the parity bits $P_1$ and $P_2$ are correct.

What is claimed is:

1. In a parity circuit, means responsive to the presence of all binary digits in a word for producing an indication of an odd or even number of ones in the word; and means in said circuit responsive to the absence of one or more of the binary digits in said word for preventing the production of said indication.

2. In a circuit for determining with the aid of a parity binary digit whether the parity of a word made up of binary digits is correct: means responsive to the presence of all binary digits in the word for producing a single binary digit indicative of whether there are an odd or even number of ones in the word and to the absence of one or more of the binary digits in said word for preventing the production of said single binary digit; and means for comparing said single binary digit with said parity binary digit for producing an indication of parity or no parity.

3. In a circuit for determining with the aid of a parity binary digit whether the parity of a word made up of binary digits is correct: means responsive to the presence of all binary digits in the word for producing a binary indication of whether there are an odd or even number of ones in the word and to the absence of one or more of the binary digits in said word for preventing the production of said binary indication; and means responsive to said binary indication and said parity binary digit for producing an indication of parity or no parity.

4. In a circuit as set forth in claim 2, said means for producing a binary indication comprising means for producing a binary digit and its complement.

5. In a system for determining with the aid of a parity binary digit and its complement whether the parity of two words, one made up of binary digits and the other made up of complements of the binary digits, is correct; a circuit responsive to the presence of all binary digits in one word and complements of these digits in the other word for generating a binary digit C and its complement D to indicate an odd number of ones in one of the words, and a binary digit $\overline{C}$ and its complement $\overline{D}$ to indicate an even number of ones in said one word; and means in said circuit responsive to the absence of a binary digit in one of the words for producing two binary digits of the same value.

6. In a circuit for determining with the aid of a parity binary digit and its complement whether the parity of two words, one made up of binary digits and the other made up of complements of the binary digits, is correct; means responsive to the presence of all binary digits in one word and complements of these digits in the other word for generating a binary digit C and its complement D to indicate an odd number of ones in one of the words, and a binary digit $\overline{C}$ and its complement $\overline{D}$ to indicate an even number of ones in said one word, and responsive to the absence of a binary digit in one of the words for producing two binary digits of the same value; and means responsive to the generation of said binary digit and its complement and to said parity binary digit and its complement for producing an indication of parity or no parity.

7. In a circuit for determining with the aid of a parity binary digit and its complement whether the parity of two words, one made up of binary digits and the other made up of complements of the binary digits, is correct; means responsive to the presence of all binary digits in one word and complements of these digits in the other word for generating a binary digit C and its complement D to indicate an odd number of ones in one of the words, and a binary digit $\overline{C}$ and its complement $\overline{D}$ to indicate an even number of ones in said one word; and means responsive to the absence of a binary digit in one of the words for producing an indication of the absence of said digit.

8. In a circuit for determining with the aid of a parity binary digit and its complement whether the parity of two words, one made up of binary digits and the other made up of complements of the binary digits, is correct; means responsive to the presence of all binary digits in one word and complements of these digits in the other word for generating a binary digit C and its complement D to indicate an odd number of ones in one of the words, and a binary digit $\overline{C}$ and its complement $\overline{D}$ to indicate an even number of ones in said one word, and responsive to the absence of a binary digit in one of the words for generating two binary digits of the same value; means responsive to the generation of said two binary digits of the same value for indicating the absence of a binary digit in one of the words; and means responsive to the generation of said binary digit and its complement and to said parity binary digit and its complement for producing an indication of parity or no parity.

9. In a parity generator, a circuit responsive to the presence of all binary digits in a word for indicating an odd or even number of ones in the word; circuit responsive to the absence of a binary digit in the word for indicating a missing binary digit; and means responsive to the presence of an indication of an odd or even number of ones in the word and the absence of an indication of a missing binary digit in the word for generating a parity binary digit.

10. In a parity generator, a circuit responsive to the presence of all binary digits in a first word and the complements of these digits in a second word for producing an indication of an odd or even number of ones in the word; means in said circuit responsive to the absence of a binary digit in one of the words for indicating such absence; and means responsive to said indication of odd or even number of ones for generating a parity binary digit.

11. In a parity circuit, means responsive to the presence of all binary digits in a first word and complements of these binary digits in a second word for producing a binary indication of whether there are an odd or even number of ones in the word and to the absence of a binary digit in one of the words for preventing the production of said binary indication; means responsive to said binary indication for generating a parity binary digit; and means responsive to the absence of said binary indication for preventing the generating of a parity binary digit.

12. A circuit for generating a parity binary digit of one value when the parity of a word made up of binary digits is odd and of another value when the parity of said word is even comprising, means responsive to the presence of all binary digits in the word for producing a binary indication of an odd or even number of ones in the word and to the absence of one or more binary digits in the word for preventing the production of said binary indication; and means responsive to the production of said binary indication for generating a parity binary digit which has one value when the binary indication represents an odd number of ones and another value when the binary indication represents an even number of ones.

13. In a circuit to which a word made up of binary digits is applied, in combination, a plurality of multiple input first none gates to each of which a different one of said binary digits and its complement is applied, each for producing an output in response to the absence of the binary digit and its complement; and other multiple input none gates to which binary digits making up the word are applied each for preventing the passage of binary digits in response to an output from a first none gate.

14. In a circuit to which a word made up of binary digits is applied, in combination, a plurality of multiple input first logic gates, each for producing an output only in response to the absence of a binary digit and its complement; means for asynchronously applying a different one of said binary digits and its complement to each of said gates; other multiple input logic gates, each responsive to an output from a first logic gate for preventing the passage of binary digits; and means for asynchronously applying different ones of said binary digits and their complements to said other logic gates.

15. In a circuit for performing an operation on a word made up of binary digits, a plurality of multiple input logic first gates, each for producing an output only in response to the absence of a binary number and its complement; means for asynchronously applying a different one of said binary numbers and its complement to each of said first gates; other multiple input logic gates, each for producing an output in response to a different combination of binary digits, and each being rendered inactive in response to an output from a first gate; and means for asynchronously applying different combinations of binary digits to said other gates.

References Cited by the Examiner

UNITED STATES PATENTS 2,552,629 5/1951 Hamming et al. ---- 235—153 X

OTHER REFERENCES

December 1958, IBM Technical Disclosure Bulletin (Pamerene), Vol. 1, No. 4.

ROBERT C. BAILEY, *Primary Examiner.*

CORNELIUS D. ANGEL, WALTER W. BURNS, Jr., MALCOLM A. MORRISON, *Examiners.*